(12) United States Patent
Oz

(10) Patent No.: US 12,017,340 B2
(45) Date of Patent: Jun. 25, 2024

(54) ROBOTIC ARM PLUS ACCESSORY KIT

(71) Applicant: The State of Israel, Israel National Police, Jerusalem (IL)

(72) Inventor: Lior Oz, Jerusalem (IL)

(73) Assignee: The State of Israel, Israel National Police, Jerusalem (IL)

(*) Notice: Subject to any disclaimer, the term of this patent is extended or adjusted under 35 U.S.C. 154(b) by 616 days.

(21) Appl. No.: 17/049,978

(22) PCT Filed: May 3, 2019

(86) PCT No.: PCT/IL2019/050496
§ 371 (c)(1),
(2) Date: Oct. 23, 2020

(87) PCT Pub. No.: WO2019/211857
PCT Pub. Date: Nov. 7, 2019

(65) Prior Publication Data
US 2021/0387349 A1 Dec. 16, 2021

(30) Foreign Application Priority Data

May 3, 2018 (IL) .......................................... 259137

(51) Int. Cl.
*B25J 15/04* (2006.01)
*B25J 5/00* (2006.01)
(Continued)

(52) U.S. Cl.
CPC ........... *B25J 11/0025* (2013.01); *B25J 5/007* (2013.01); *B25J 9/0087* (2013.01); *B25J 9/06* (2013.01); *B25J 15/04* (2013.01); *B25J 5/005* (2013.01)

(58) Field of Classification Search
CPC . B25J 5/005; B25J 5/007; B25J 9/0087; B25J 9/06; B25J 11/0025; B25J 15/04; B25J 15/0433
See application file for complete search history.

(56) References Cited

U.S. PATENT DOCUMENTS

| 4,620,362 A | * | 11/1986 | Reynolds | ................. B25J 15/04 414/730 |
| 8,942,851 B1 | * | 1/2015 | Maier | ...................... B25J 15/04 700/259 |

(Continued)

FOREIGN PATENT DOCUMENTS

| DE | 29508794 | 12/1995 |
| EP | 2620260 | 7/2013 |

(Continued)

OTHER PUBLICATIONS

Supplementary European Search Report and the European Search Opinion dated Jan. 10, 2022 From the European Patent Office Re. Application No. 19797097.3. (10 Pages).

(Continued)

*Primary Examiner* — Dale Moyer

(57) ABSTRACT

A robotic arm includes an arm with a plurality of degrees of freedom and a gripper configured to manipulate a plurality of tools. The gripper includes a pair of claws. Each claw of the pair includes a first portion of a connector that is configured to connect to a second portion of the connector integrated on each of the plurality of tools.

20 Claims, 15 Drawing Sheets

(51) Int. Cl.
    *B25J 9/00*     (2006.01)
    *B25J 9/06*     (2006.01)
    *B25J 11/00*    (2006.01)

(56) References Cited

U.S. PATENT DOCUMENTS

| | | | | |
|---|---|---|---|---|
| 2010/0068024 | A1* | 3/2010 | Agens | B25J 15/04 |
| | | | | 901/30 |
| 2013/0313791 | A1* | 11/2013 | Setrakian | B25J 15/0433 |
| | | | | 279/143 |
| 2018/0236666 | A1* | 8/2018 | Mozeika | B25J 13/006 |

FOREIGN PATENT DOCUMENTS

| | | | | |
|---|---|---|---|---|
| EP | 3072641 | | 9/2016 | |
| EP | 3072641 | A1 * | 9/2016 | ......... B25J 11/0025 |
| EP | 3098031 | | 11/2016 | |
| EP | 3098031 | A1 * | 11/2016 | ......... B25J 11/0025 |
| WO | WO 2019/211857 | | 11/2019 | |

OTHER PUBLICATIONS

Office Action dated Jul. 25, 20021 From the Israel Patent Office Re. Application No. 259137 and Its Translation Into English. (6 Pages).
Office Action dated Mar. 29, 2022 From the Israel Patent Office Re. Application No. 259137 and Its Translation Into English. (6 Pages).
International Preliminary Report on Patentability dated Nov. 12, 2020 From the International Bureau of WIPO Re. Application No. PCT/IL2019/050496. (9 Pages).
International Search Report and the Written Opinion dated Aug. 18, 2019 From the International Searching Authority Re. Application No. PCT/IL2019/050496. (12 Pages).
Kinova "JACO2: Assistive User Guide", Kinova Robotics, p. 1-27, Apr. 2017.
Robotiq "Specifications", Robotiq Support, Instruction Manual, Chap.6, 25 P., 2016.
Valley Associates "REMOTEC Andros Wolverine: Outdoor, All-Terrain Workhosc of the Andros Linc", Valley Associates Corporation, Global Security Company, Product Description, 2 P., 2016.

* cited by examiner

PARALLEL GRIP

ENCOMPASSING GRIP

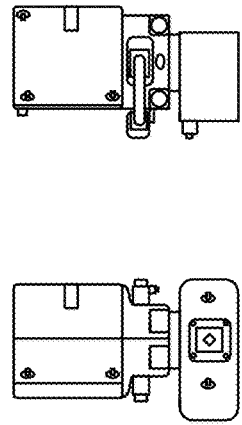
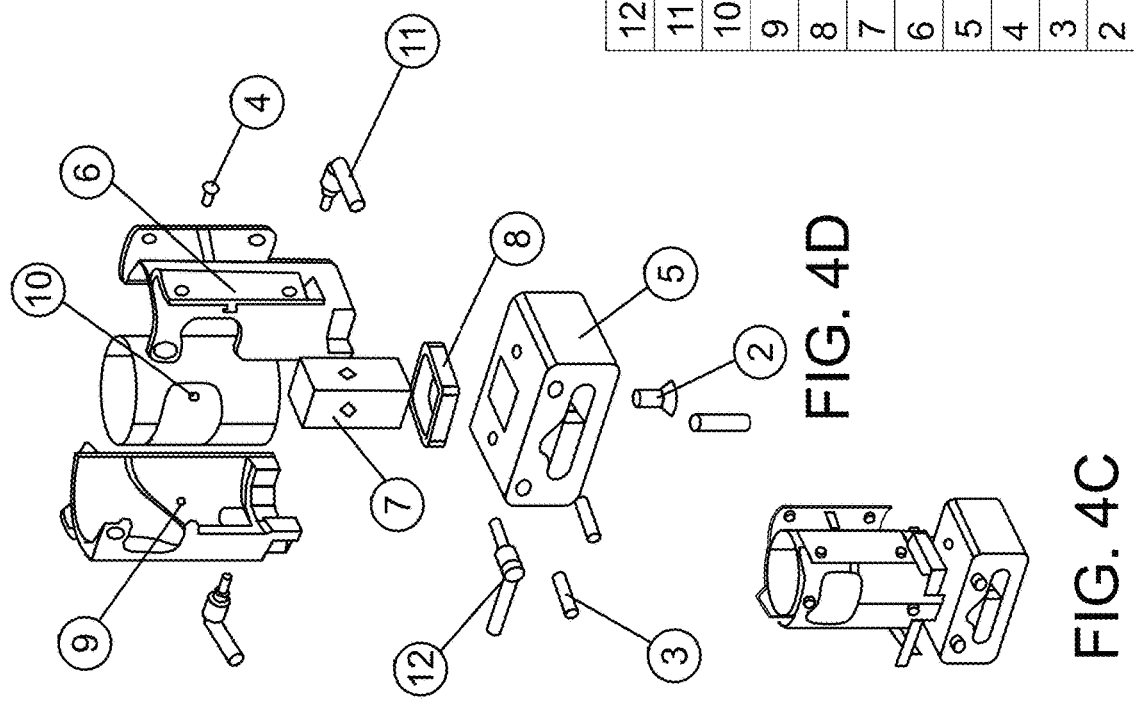
FIG. 4A  FIG. 4B  FIG. 4C  FIG. 4D

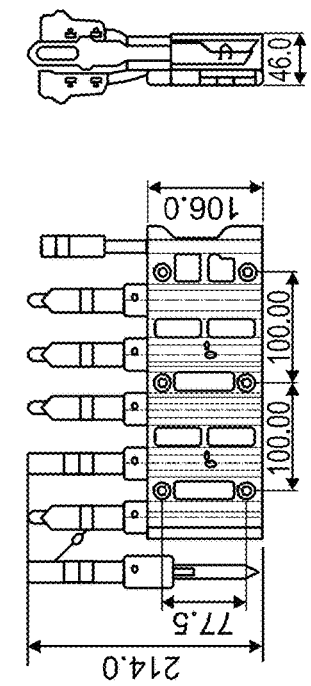
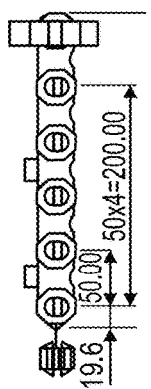
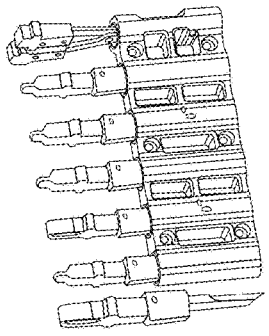
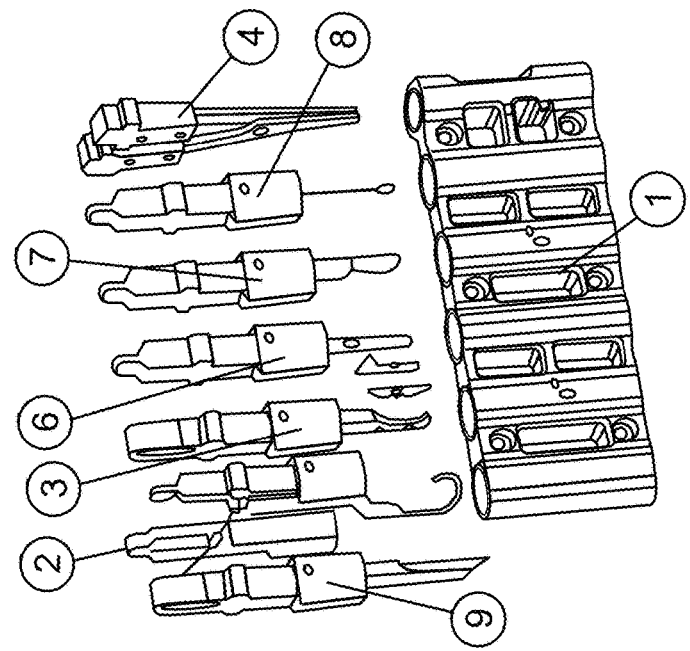
FIG. 6A  FIG. 6B  FIG. 6C  FIG. 6D  FIG. 6E
| 9 | RF steel blade holder Assy |
| 8 | RF stick holder Assy |
| 7 | RF scalpel holder Assy |
| 6 | RF screwdriver holder Assy |
| 4 | CA Assy |
| 3 | RF ceramic blade holder Assy |
| 2 | RF hook holder Assy |
| 1 | RF tool storage box |

ROBOTIC ARM PLUS ACCESSORY KIT

RELATED APPLICATIONS

This application is a National Phase of PCT Patent Application No. PCT/IL2019/050496 having International filing date of May 3, 2019, which claims the benefit of priority of Israel Patent Application No. 259137 filed on May 3, 2018. The contents of the above applications are all incorporated by reference as if fully set forth in their entirety.

FIELD AND BACKGROUND OF THE INVENTION

The present invention, in some embodiments thereof, relates to a robotic arm configured for fine motor skill tasks and, more particularly, but not exclusively, to a robotic arm configured to render safe or neutralize explosive devices.

Terrorist and extreme radical organizations are known to use explosive devices such as improvised explosive devices (IEDs) as attack weapons. Often, a terrorist may hide the device in a vehicle, building or other structure. Terrorist and extreme radical organizations may also add hazardous materials that are unconventional in the IEDs in order to increase fatalities.

Global security, anti-terror and intelligence units are known to use mobile robotic devices to cope with such threats. The mobile robotic device may be operated by remote control to approach a suspicious object, inspect the object and optionally detonate the object. Detonating an IED that includes additional hazardous and unconventional materials may cause spreading of the material, which may pose a threat to the surrounding environment even with controlled detonation.

U.S. Pat. No. 4,932,831 entitled "All terrain mobile robot," the contents of which is incorporated by reference describes a remotely controlled vehicle for traversing various terrains to accomplish missions in a hostile environment. This remotely controlled vehicle has a main chassis with rotatable tracks on either side thereof that supports a central body of the vehicle. Auxiliary chassis in a forward and rearward direction also carry tracks on either side, with these auxiliary chassis being pivotable to raised or lowered positions to accomplish movement over uneven terrain. The body carries a deployable arm including a shoulder, an elbow and a wrist, with this arm being provided with five degrees of motion.

SUMMARY OF THE INVENTION

According to an aspect of some embodiments of the present invention there is provided a robotic arm that is configured to perform fine motor skill tasks to inspect or disarm an explosive device without detonating the device. According to some example embodiments, the robotic arm may be used as a standalone device or may be integrated as part of a robot. Optionally, an existing robot may be retrofitted with the robotic arm. According to some example embodiments, the robotic arm provides for manipulating a tool with fine motor skills by remote control. According to an aspect of some embodiments of the present invention there is provided an accessory kit for a robotic arm that includes a plurality of tools that is adapted for use with the robotic arm.

According to an aspect of some example embodiments, there is provided a robotic arm comprising: an arm including at least a plurality of degrees of freedom; and a gripper configured to manipulate a plurality of tools, wherein the gripper includes a pair of claws and wherein each claw of the pair includes a first portion of a connector that is configured to connect to a second portion of the connector integrated on each of the plurality of tools.

Optionally, gripping of the tool is configured to prevent movement of a handle of the tool with respect to the pair of claws.

Optionally, the first portion of the connector is a female connector and the second portion of the connector is a corresponding male connector.

Optionally, the first portion of the connector and the second portion of the connector are electrically connected.

Optionally, the robotic arm includes a camera configured to capture images of a working area of the gripper.

Optionally, the camera is a thermal camera.

Optionally, the robotic arm includes a light emitting diode (LED) configured to illuminate a working area of the gripper.

Optionally, the robotic arm includes a laser configured to point in a working area of the gripper.

Optionally, the gripper is configured to alternately connect to each of the plurality of tools based on remote controlled movement.

Optionally, the robotic arm includes a mounting device, wherein the mounting device is configured to removably mount the robotic arm onto a robotic vehicle.

Optionally, the robotic arm includes a controller configured for controlling movement of the gripper based on remote commands received via a wireless communication channel.

Optionally, the robotic arm includes at least one sensor, wherein the controller is configured to transmit output from the at least one sensor via the wireless communication channel.

According to an aspect of some example embodiments, there is provided kit for a robotic arm comprising: a cartridge comprising a plurality of bores configured to receive tools; a mounting device configured to mount the cartridge on a robotic vehicle; and a plurality of tools, configured to be stored in the bores of the cartridge; wherein each of the plurality of tools includes a handle and wherein the handle is formed with a connector that is configured to mechanically connect to a counterpart connector on a claw of a robotic arm.

Optionally, the handle is formed with a pair of connector on opposing surfaces.

Optionally, the connector is configured to electrically connect to a counterpart connector on a claw of a robotic arm.

Optionally, the plurality of tools is selected from a group including, knives, screw drivers, pliers and hooks.

According to some example embodiments, there is provided a robotic vehicle comprising: a motor vehicle configured to maneuver based on remote control; a first robotic arm mounted on the robotic vehicle and configured for performing gross motor skill tasks; a second robotic arm mounted on the robotic vehicle configured for performing fine motor skill tasks; and a controller configured for controlling operation of each of the first robotic arm, the second robotic arm and the motor vehicle based on remote control commands received via a wireless communication channel.

Optionally, the second robotic arm is the robotic arm described herein above.

Optionally, the controller is configured to coordinate movement between the first robotic arm and the second robotic arm.

Optionally, the robotic vehicle includes a tool kit described herein above.

Optionally, the robotic vehicle includes at least one sensor, wherein the controller is configured to communicate output from the at least one sensor to a remote control device via the wireless communication channel.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWING(S)

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIGS. 4A, 4B, 4C and 4D are front, back, perspective and blow out views of an example mounting device for the accessory robotic arm in accordance with some example embodiments;

FIGS. 6A, 6B, 6C, 6D and 6E are perspective, front, top, side and blow out views of an example tool kit for the accessory robotic arm all in accordance with some example embodiments;

DESCRIPTION OF SPECIFIC EMBODIMENTS OF THE INVENTION

Figure 1A:
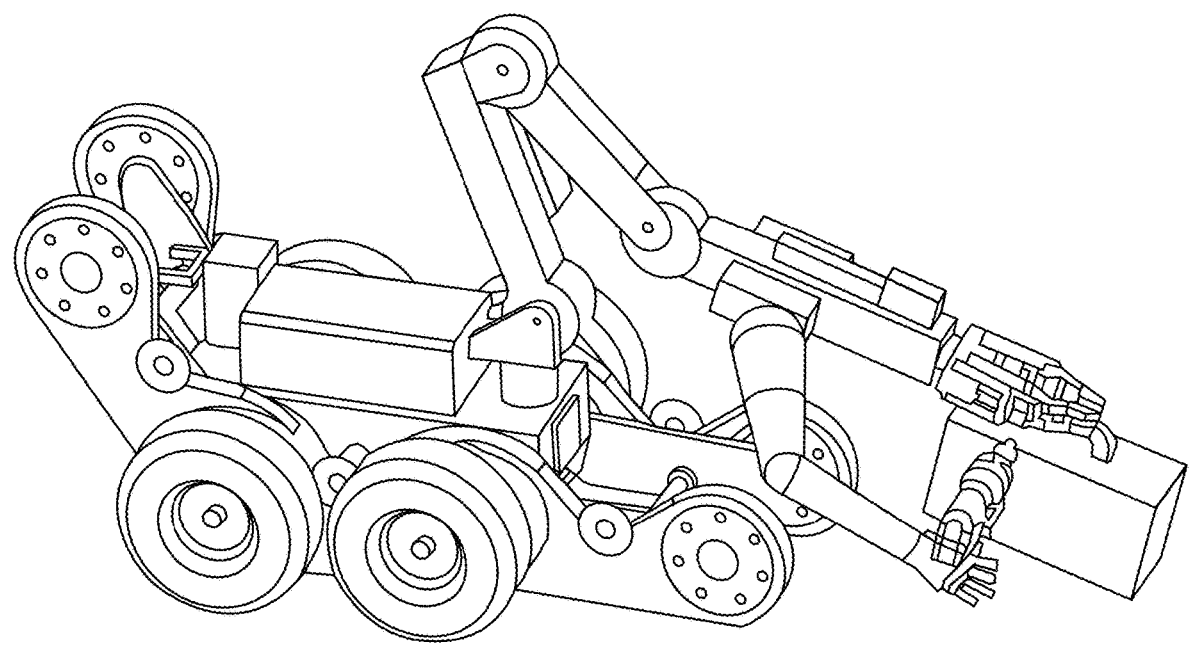
FIGS. 1A, 1B, 1C and 1D are simplified schematic drawings showing example configurations for integrating an accessory robotic arm on a robotic vehicle in accordance with some example embodiments.
Figure 1B:
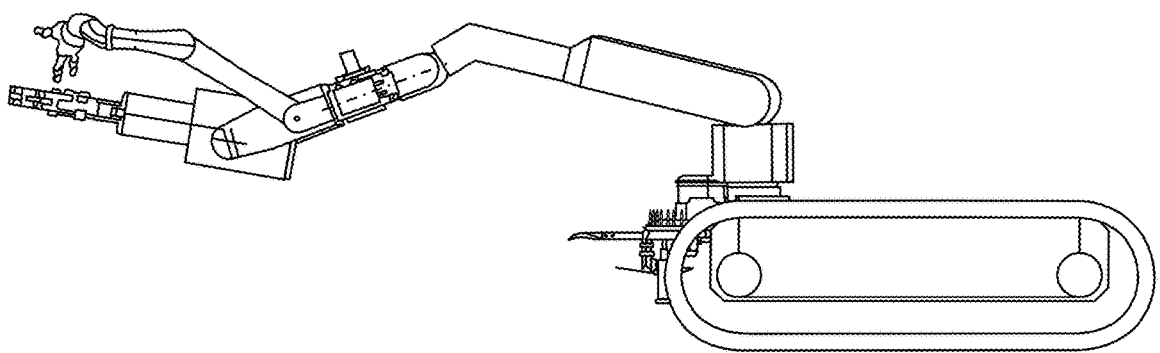
Figure 1C:
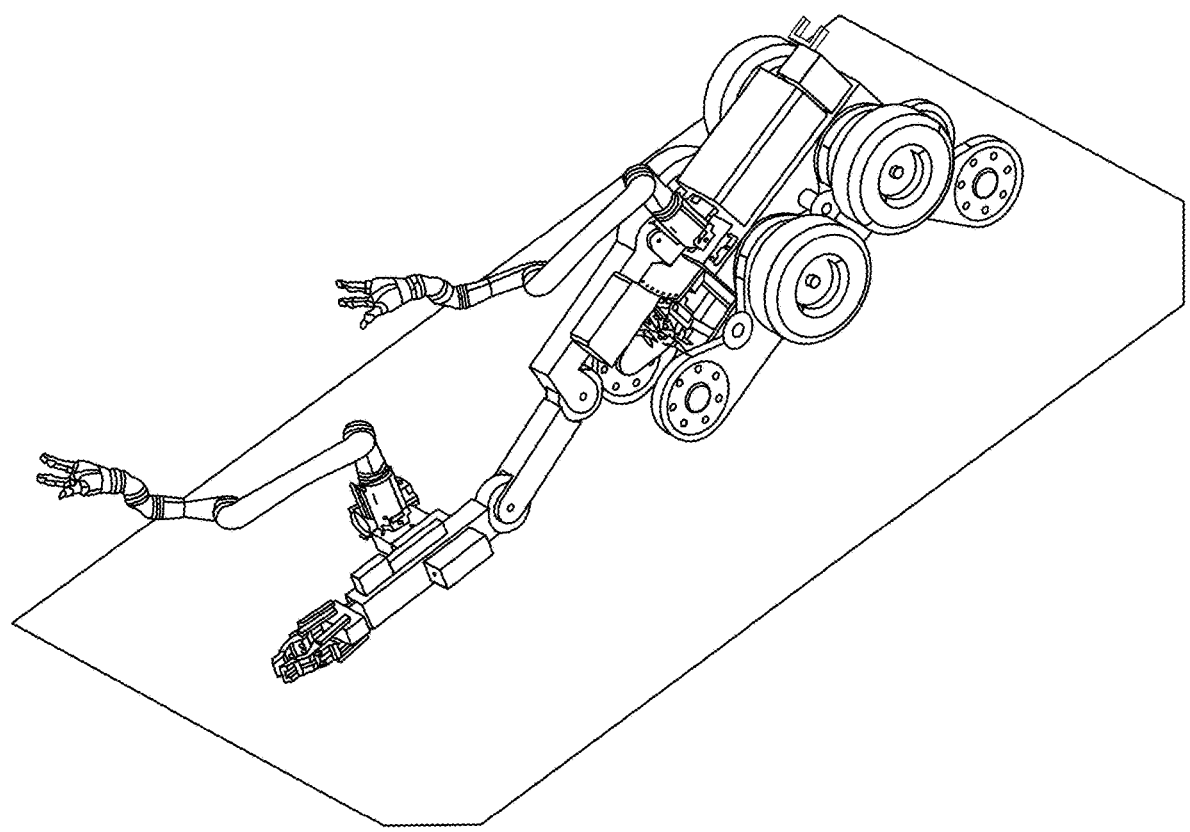
Figure 1D:
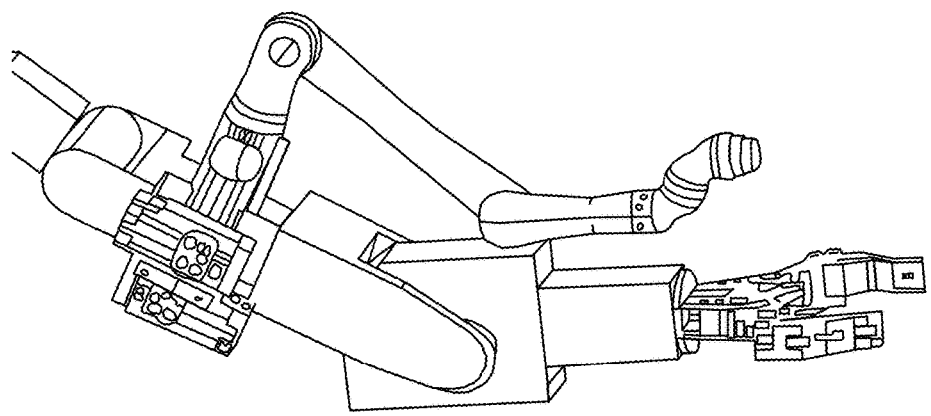
Figure 2A:
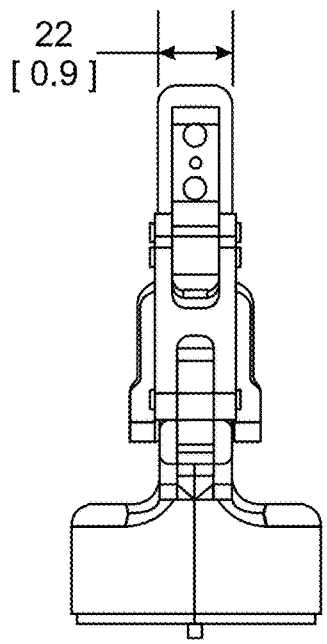
FIGS. 2A, 2B, 2C and 2D are example gripping postures for an example gripper of the accessory robotic arm in accordance with some example embodiments.
Figure 2B:
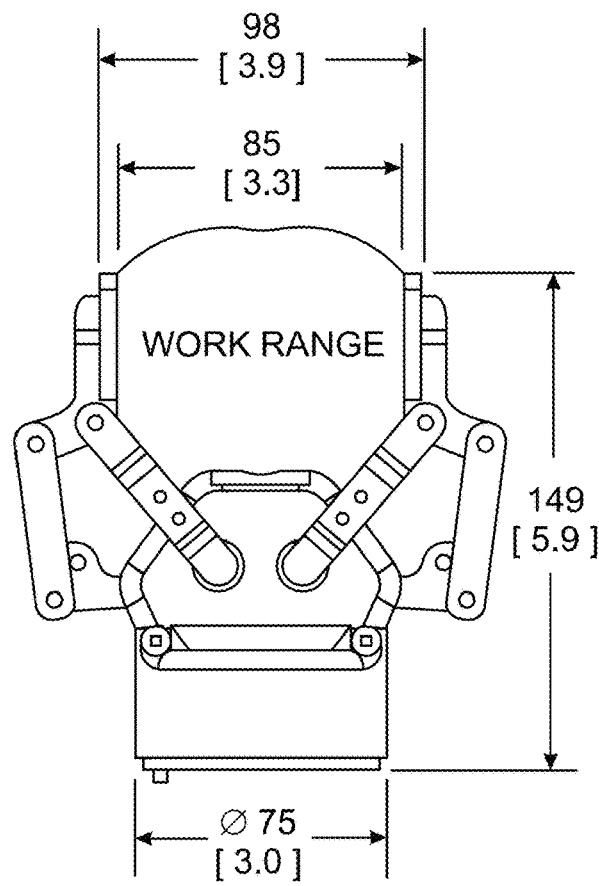
Figure 2C:
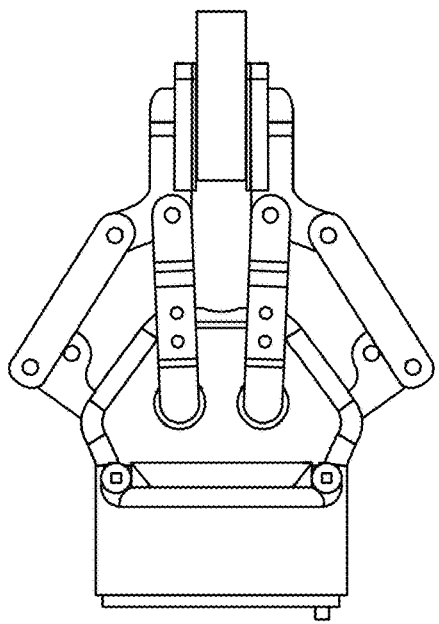
Figure 2D:
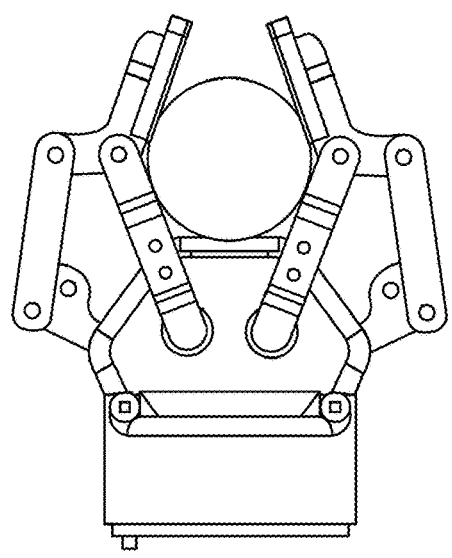

The present invention, in some embodiments thereof, relates to a robotic arm configured for fine motor skill tasks and, more particularly, but not exclusively, to a robotic arm configured to render safe or neutralize explosive devices.

At times, it may be preferable to neutralize an explosive device without detonating the device. One such scenario may when there is a fear that detonation may spread a harmful material included in the explosive. Another scenario maybe when the explosive device is near a populated area. Neutralizing without detonating may also enable studying the explosive device for gathering intelligence.

Known robotic vehicles that are operated for military operations and the like typically include a vehicle robotic arm that can perform gross motor skill tasks such as forced entry and manipulation of firing arms for detonating a suspicious object. One such device is the Andros Wolverine Robot by DefenseTechs in Israel. The arm may be configured for performing gross motor skill tasks such as forced entry and manipulation of firing arms for detonating a suspicious object. This arm may not be suitable to effectively handle tools with fine motor skills to neutralize an explosive device without detonating.

According to some example embodiments, there is provided a robotic arm that may add this functionality to an existing robot, optionally as an accessory to the existing robotic device and may optionally be operated as a stand alone device. The accessory robot arm may be operated in coordination with an existing arm of a robot device or in parallel. For example, an existing arm of the robot may be operated to hold an explosive device while the accessory arm may be operated to manipulate one or more tools to neutralize the device. In another example, the robotic vehicle may transport the accessory robotic arm to the explosive device, may apply force on with its existing robotic arm to move an obstruction and reach the explosive device and then the accessory robotic arm may inspect the device and be operated to neutralize the explosive.

According to some example embodiments, the robotic vehicle includes a gripper that is configured to manipulate a set of tools that is dedicated for use with the gripper. According to some example embodiments, the gripper includes a dedicated receptacle that is configured for receiving a dedicated male connector on a handle of a tool. Alternatively, one or both of the male connecting parts of the mating connectors may be integrated on the claws of the gripper and the receptacle may be integrated on the handle of the tools. When the gripper holds the tool with claws pressing opposite surfaces of the handle the mating connectors provide for holding the tool firmly without slipping or rotating of the tool with respect to the gripper. This allows the gripper to manipulate the tool precisely. Tools such as pliers, screw drivers, picks, knives and the like may be manipulated by the gripper. Optionally, one or more sensing devices may also be manipulated by the gripper in a similar manner. The tools may be stored in a cartridge that is mounted on the robotic vehicle. In some example embodiments, engagement of the tool or sensor with the claw establishes an electrical connection via which the tools or sensors may be electrically powered.

According to some example embodiments, the gripper additionally includes an image sensor, e.g. a video that captures images of an area around the tools held by the gripper and transmits the images to a remote control unit. The image sensor may be regular camera or a thermal camera or both. In some example embodiments, the gripper additionally includes illumination, e.g. one or more LED that may illuminate a working area of the gripper. In some example embodiments, the gripper also includes a laser that is configured to mark and area being images to help the human operate coordinate movement of the gripper based on the images detected. Optionally, a kit including a plurality of tools housed in a cartridge is positioned on the robotic vehicle and the accessory robot may interchangeably grip anyone of the tools to perform the neutralization of the explosive device.

The accessory robotic arm may provide greater strength as compared to a robotic arm that may be used to replace an amputated arm but less forceful than the robotic arm that is used for forced entry. Optionally, the robotic arm may be coated with a material to protect it from hazardous materials such as Line-X by Line-in Alabama USA.

According to some example embodiments, the accessory robotic arm may be removably positioned on the vehicle robot with a dedicated mounting device. Optionally, the robotic arm may be positioned over the arm of the vehicle robot, under the arm of the vehicle robot or on the base of the vehicle robot. Positioning of the accessory arm may depend on the design of the robotic vehicle and the task to be performed. In some example embodiments, a vehicle robot may be retrofitted with the fine motor skill robotic arm. In some example embodiments, remote control of the accessory robotic arm or of the robotic vehicle including the accessory robotic arm may be controlled interchangeably with an analog like joystick or a digital based console similar to a gaming console depending on the task to be performed. Optionally, the accessory arm has seven degree of freedom for improved dexterity.

Reference is now made to FIGS. 1A, 1B, 1C and 1D showing simplified schematic drawings of example configurations for integrating an accessory robotic arm on a robotic vehicle in accordance with some example embodiments. One or more fine motor skill robotic arm may be mounted on an existing arm or on a base of a robotic vehicle. The fine motor skill robotic arm may be mounted to operate above the larger arm, below the larger arm (not shown) or to the side. Optionally, the accessory robotic arm may be replaceably positioned on the robotic vehicle based on the task it is to perform.

FIGS. 2A, 2B, 2C and 2D are example gripping postures for an example gripper of the accessory robotic arm in accordance with some example embodiments. According to some example embodiments, the gripper includes two claws that may be configured to manipulate a gripped object with both a parallel grip and an encompassing grip. Optionally, a working range of the gripper is between 2-6 inches, e.g. 4 inches.

Figure 3A:
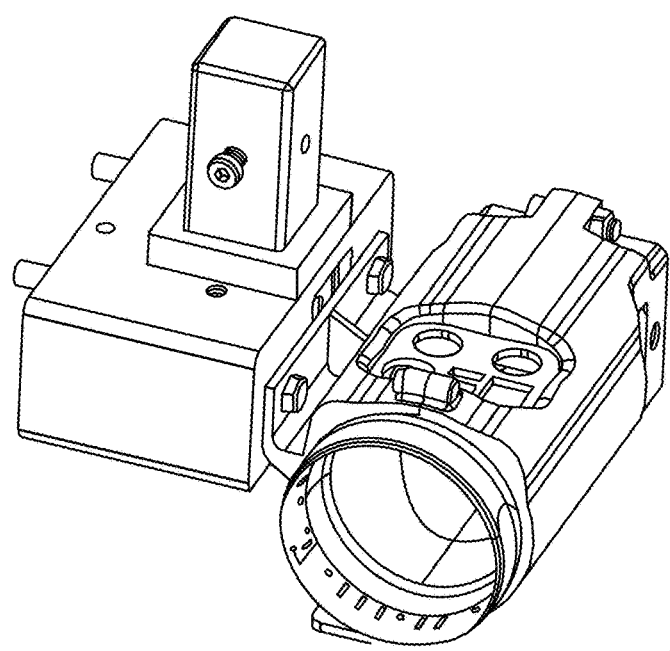
FIGS. 3A and 3B are example mounting devices for the accessory robotic arm in accordance with some example embodiments.
Figure 3B:
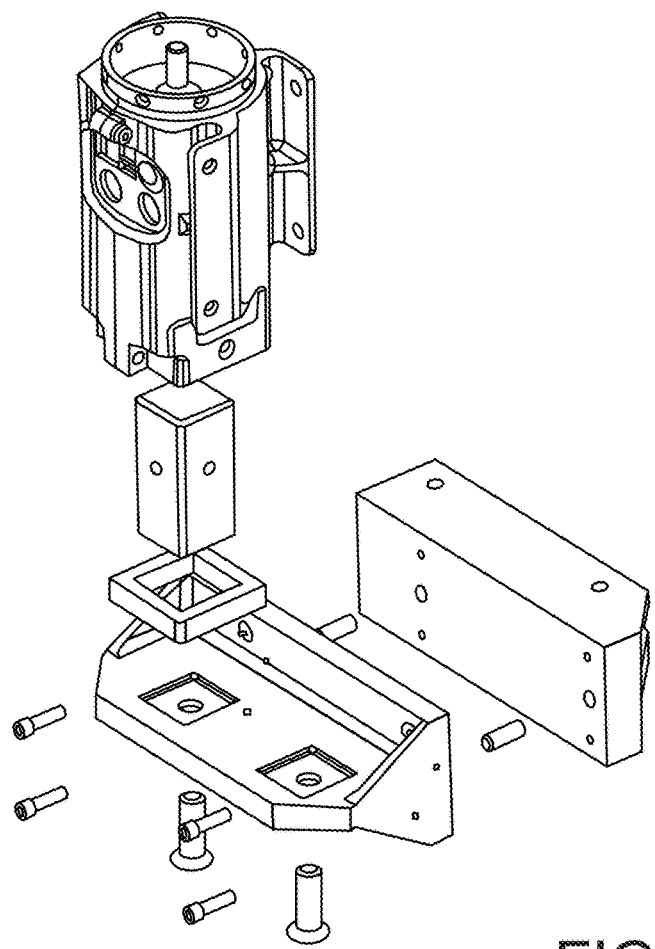

FIGS. 3A and 3B are example mounting devices for the accessory robotic arm and FIGS. 4A, 4B, 4C and 4D are front, back side and blow out views of an example mounting device for the fine skill robotic arm, all in accordance with some example embodiments. According to some example embodiments, the mounting device provides for accessory robotic arm in a plurality of different locations on a robotic vehicle and replaceably removing the accessory robotic arm. Optionally, positioning of the accessory robotic arm on the robotic vehicle depends on a location of the explosive device.

Figure 5A:
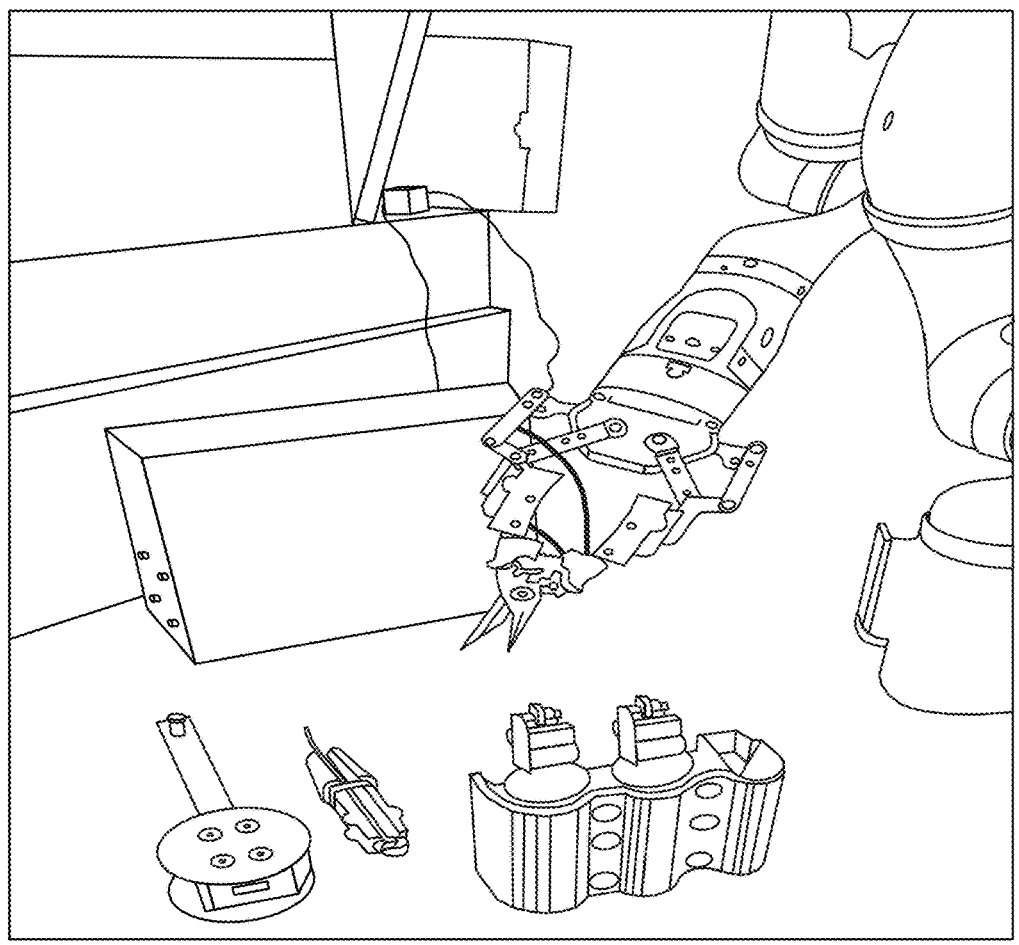
FIGS. 5A and 5B are images of an example accessory robotic arm and tool kit both in accordance with some example embodiments.
Figure 5B:
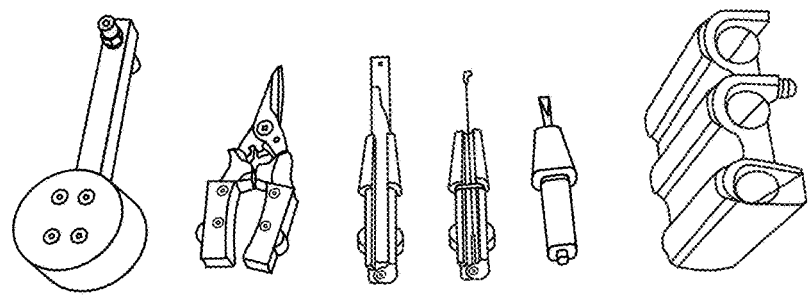

FIGS. 5A and 5B are images of an example accessory robotic arm and tool kit both in accordance with some example embodiments. According to some example embodiments, the accessory robotic arm is configured to operate a plurality of tools that are dedicated for use with a gripper of the accessory robotic arm. According to some example embodiments, the gripper includes a camera and optionally lighting configured to illuminate a working area of the gripper. Optionally, the gripper additionally includes a laser LED that is configured to point to a location that is being imaged.

In FIG. 5A, the gripper is shown to manipulating a scissor. Handles of the scissor may be spring loaded so that the scissors are fixedly maintained on the gripper during operation. FIG. 5B shows example tools that may be manipulated by the gripper and a cartridge configured to house the tools while not be used by the gripper. The gripper may interchangeably select different tools based on remote control to perform the operations for disabling the explosive device.

FIGS. 6A, 6B, 6C, 6D and 6E are perspective, front, top, side and blow out views of an example tool kit for the accessory robotic arm all in accordance with some example embodiments. Example tools that may be manipulated by the gripper include knives, scissors, pliers, screw drivers and hooks. Each tool includes a handle with a pair of connectors that is configured to fit into a matching receptacle formed in the pair of claws of the gripper. The gripper grips the tool with two opposing claws. Once gripped, the gripper moves together with tool without slipping or rotating. A cartridge is configured to house the plurality of tools while not in use. A portion of the tool that includes the plug is exposed from the cartridge so that the gripper may engage with the tool as needed.

Figure 7A:
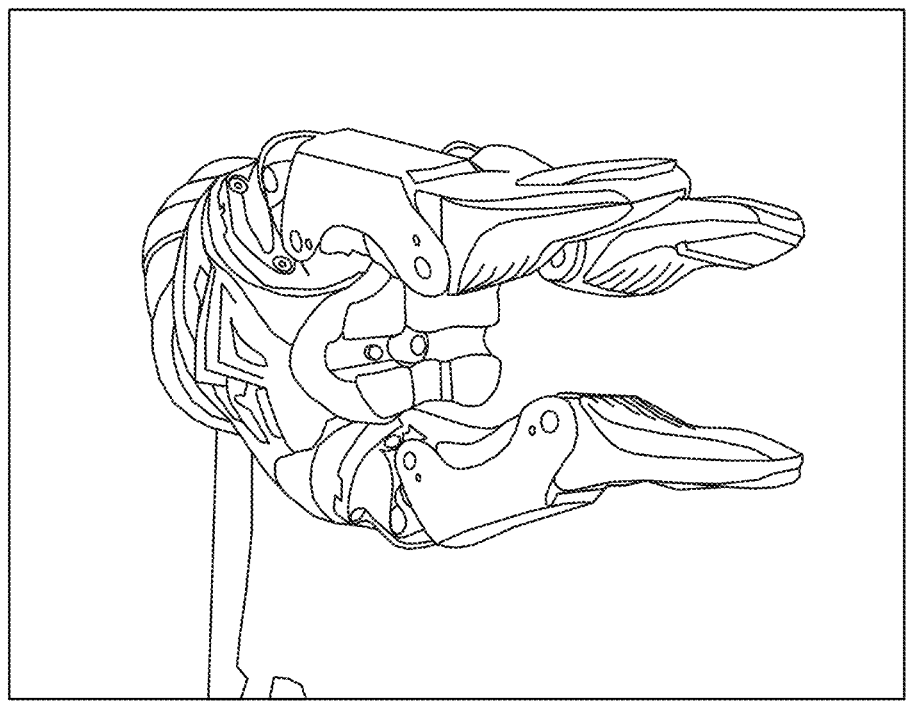
FIGS. 7A and 7B are images of an example gripper with a positioning indicating device and the example positioning indicating device respectively both in accordance with some example embodiments.
Figure 7B:
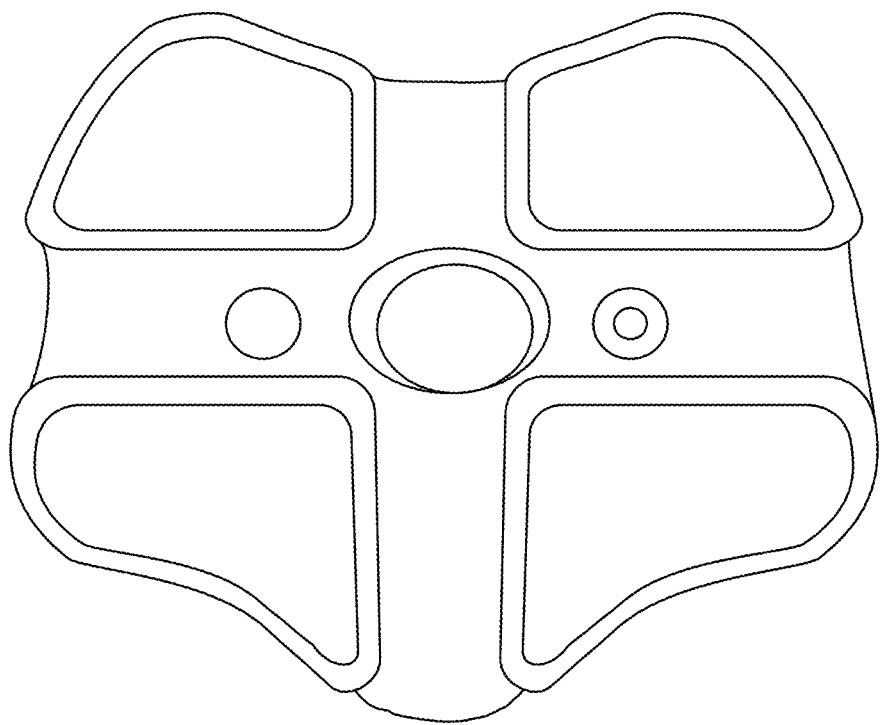

FIGS. 7A and 7B are images of an example gripper with a positioning indicating device and the example positioning indicating device respectively both in accordance with some example embodiments. FIG. 7A shows another gripper including a camera, LED and laser mounted in a palm of the gripper. Optionally, a human operator may receive a video stream from the camera and may manipulate the gripper based on the visual feedback received from the camera. The LED may provide for illuminating the area image. The laser may help the human operator understand the three dimensional space imaged by the camera.

Figure 8:
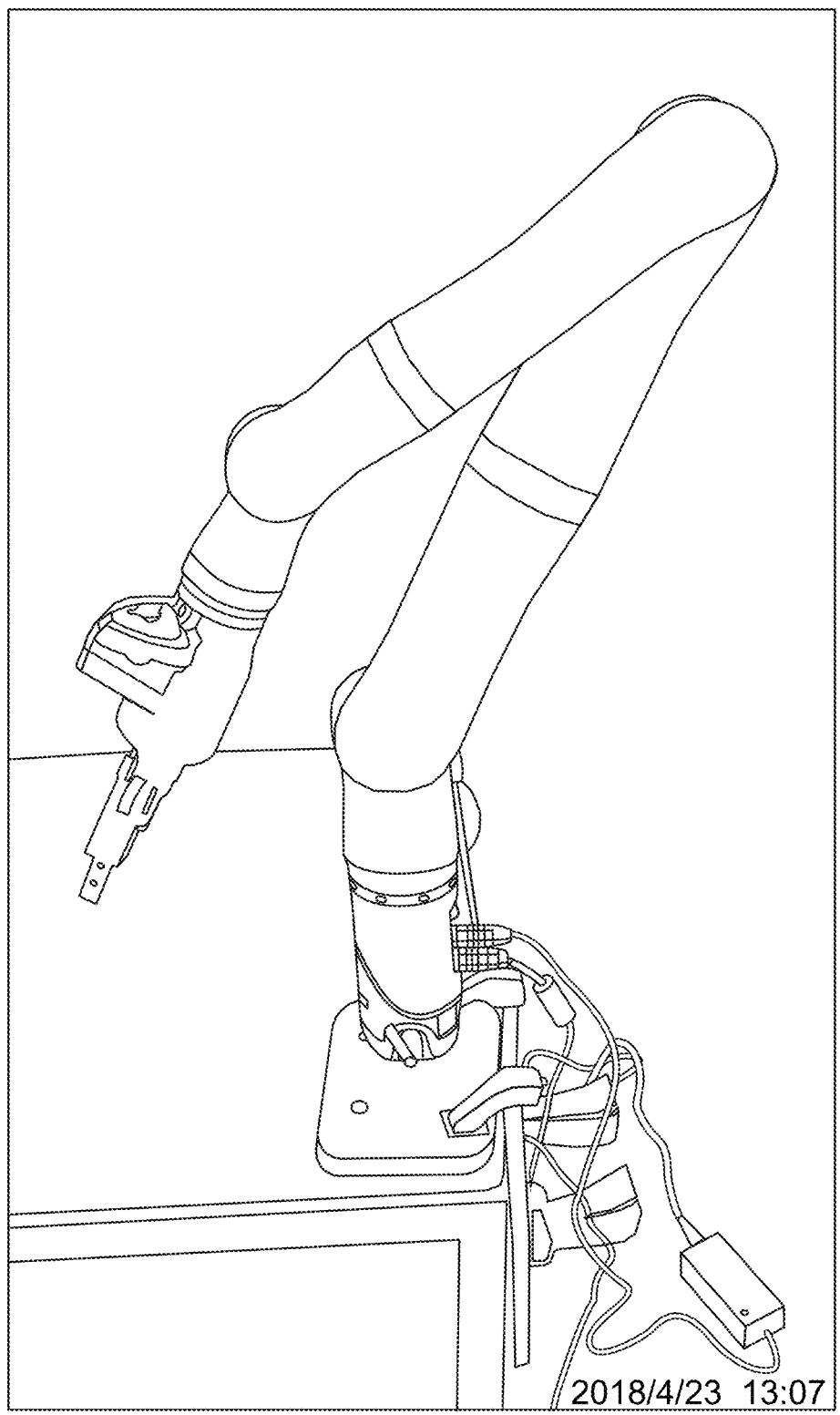
FIG. 8 is an example accessory robotic arm with a protective cover in accordance with some example embodiments.

FIG. 8 is an example fine skill robotic arm with a protective cover in accordance with some example embodiments. Optionally, the protective cover is formed with Line-X.

Figure 9:
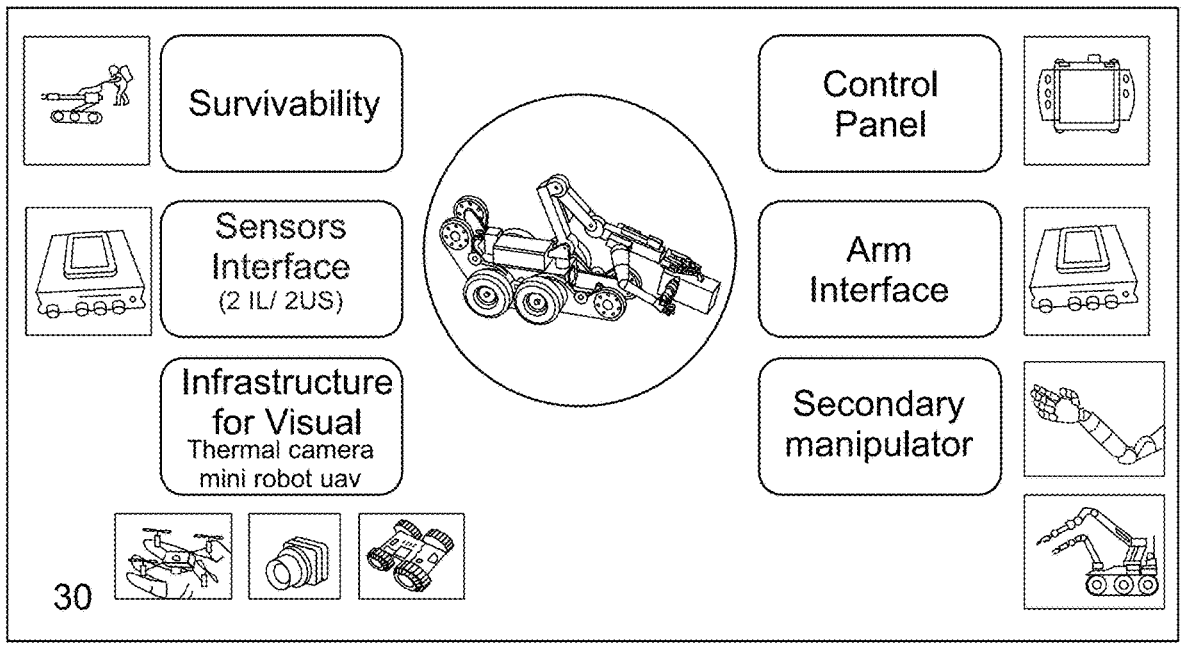
FIG. 9 is a block diagram of example components of the accessory robotic arm system in accordance with some example embodiments.
Figure 10:
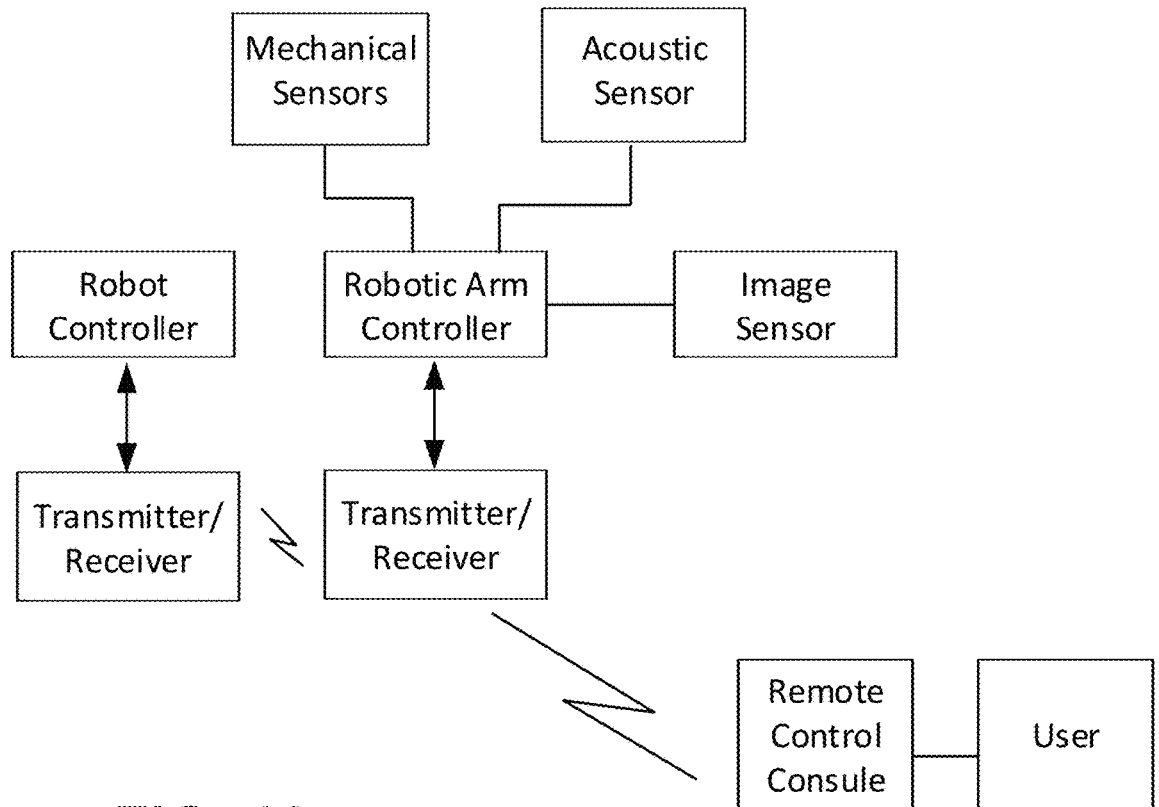
FIG. 10 is a block diagram of an example control system for the accessory robotic arm in accordance with some example embodiments.

FIG. 9 is a block diagram of example components of the accessory robotic arm system and FIG. 10 is a block diagram of an example control system for accessory robotic arm, both in accordance with some example embodiments.

Figure 11A:
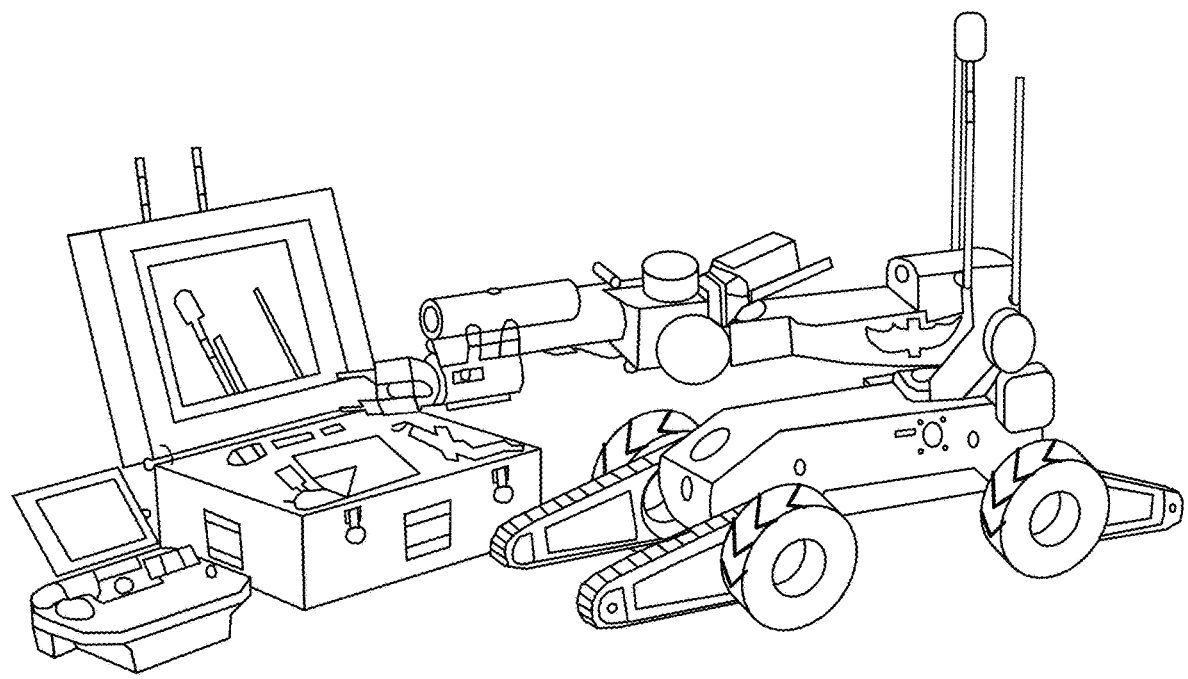
FIGS. 11A, 11B, 11C, 11D, 11E, 11F, 11G, 11H, 11I and 11J are images of example accessory robotic arms integrated on a robotic vehicle and performing fine motor skill tasks all in accordance with some example embodiments.
Figure 11B:
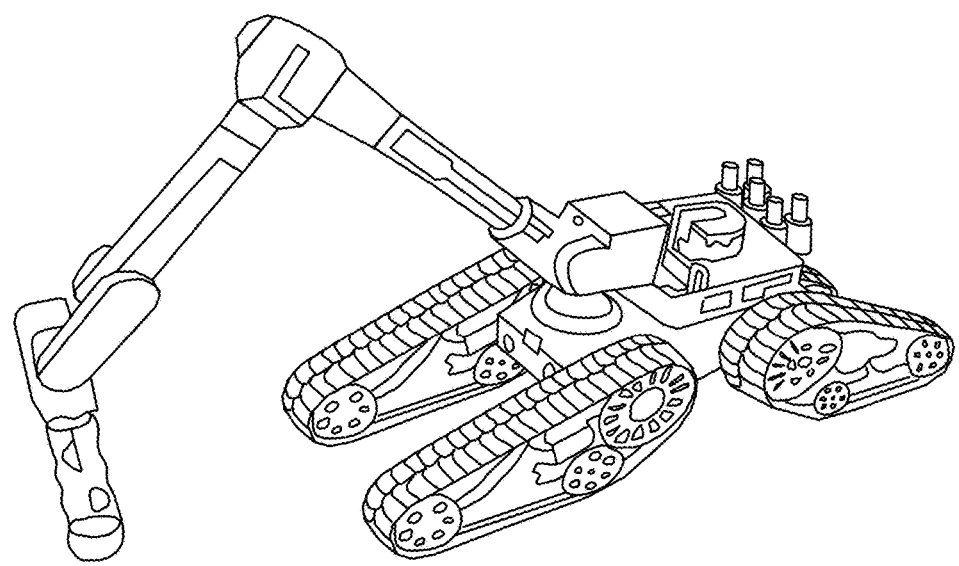
Figure 11C:
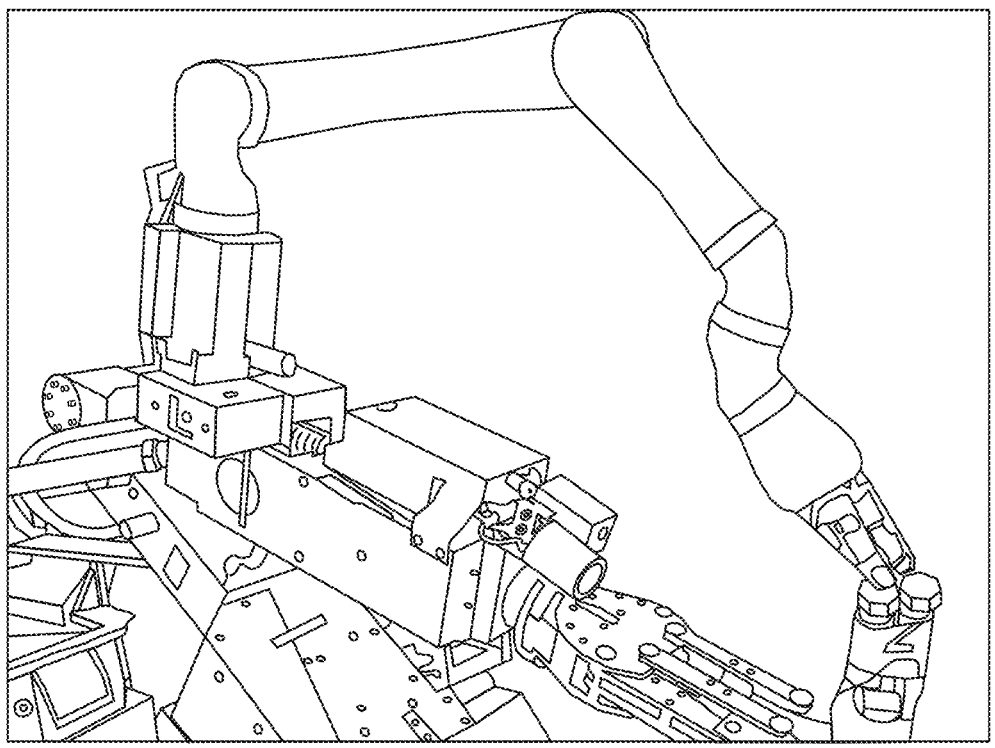
Figure 11D:
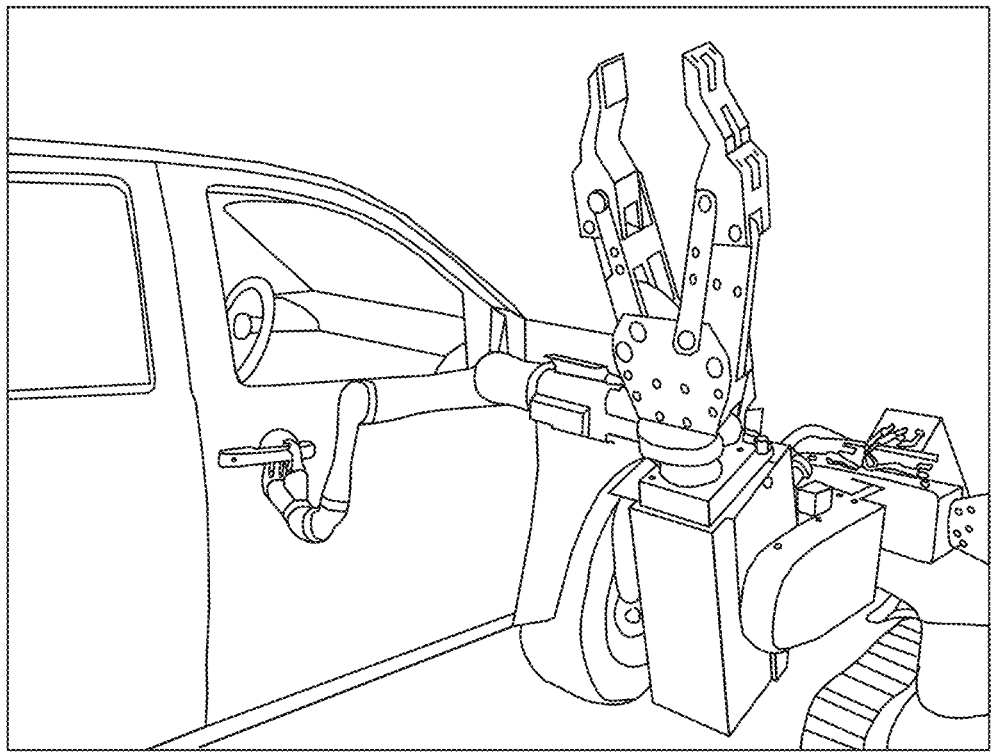
Figure 11E:
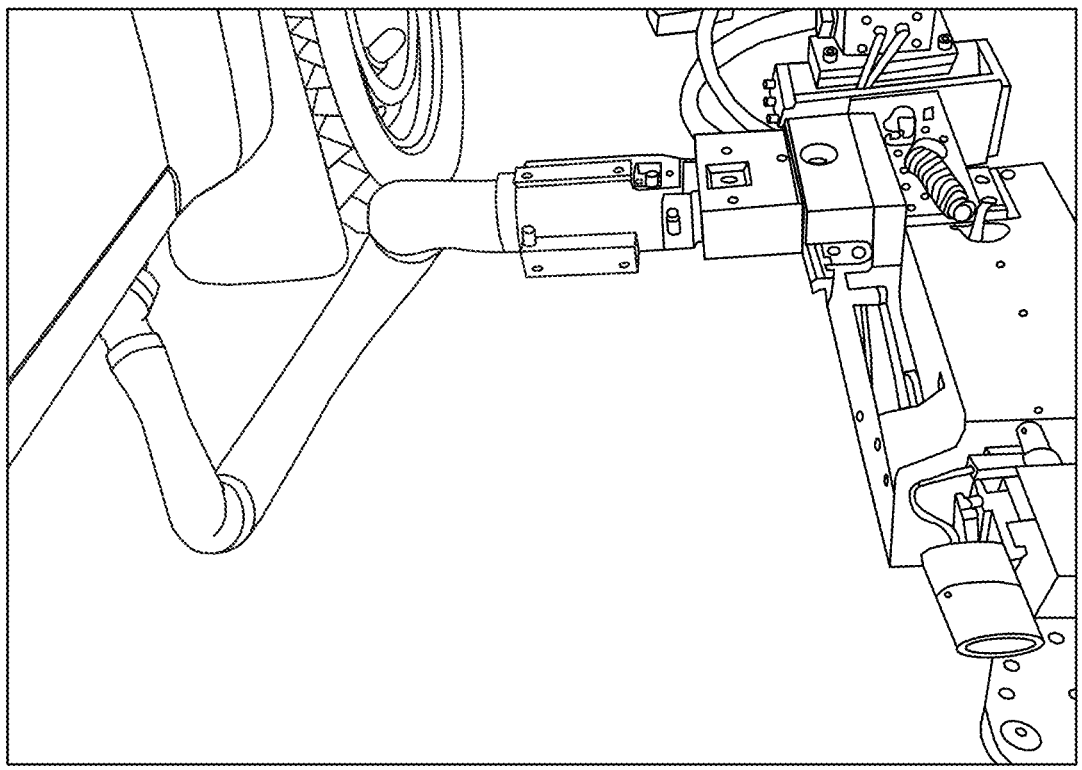
Figure 11F:
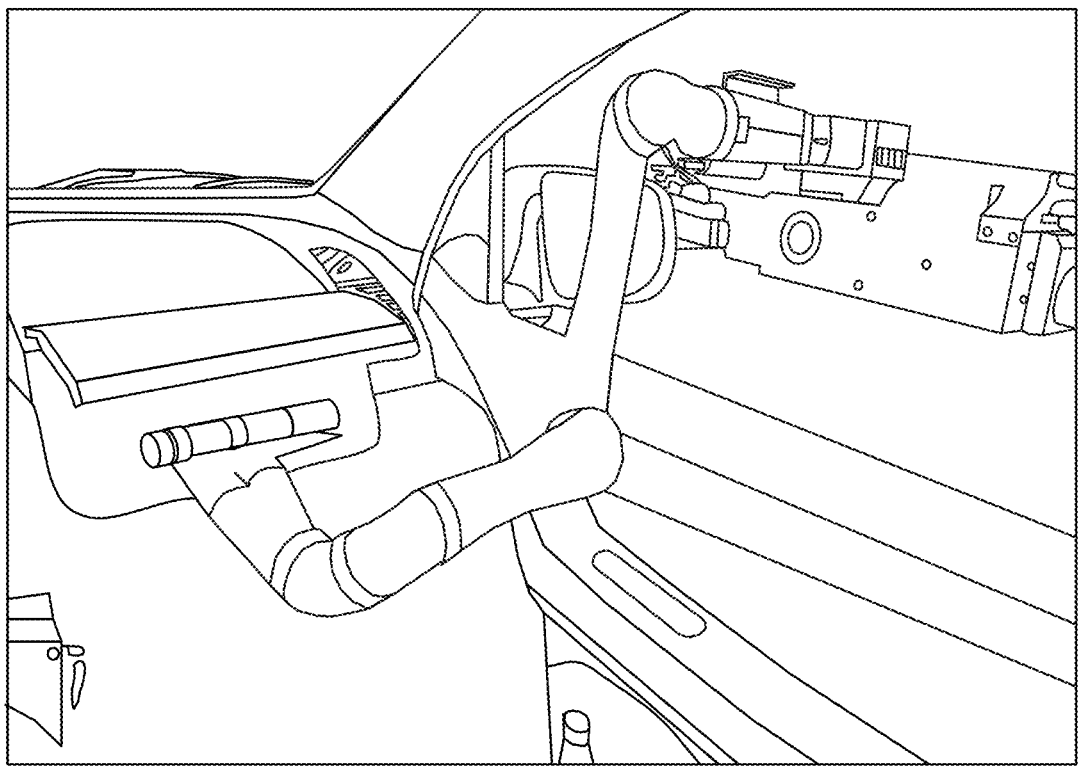
Figure 11G:
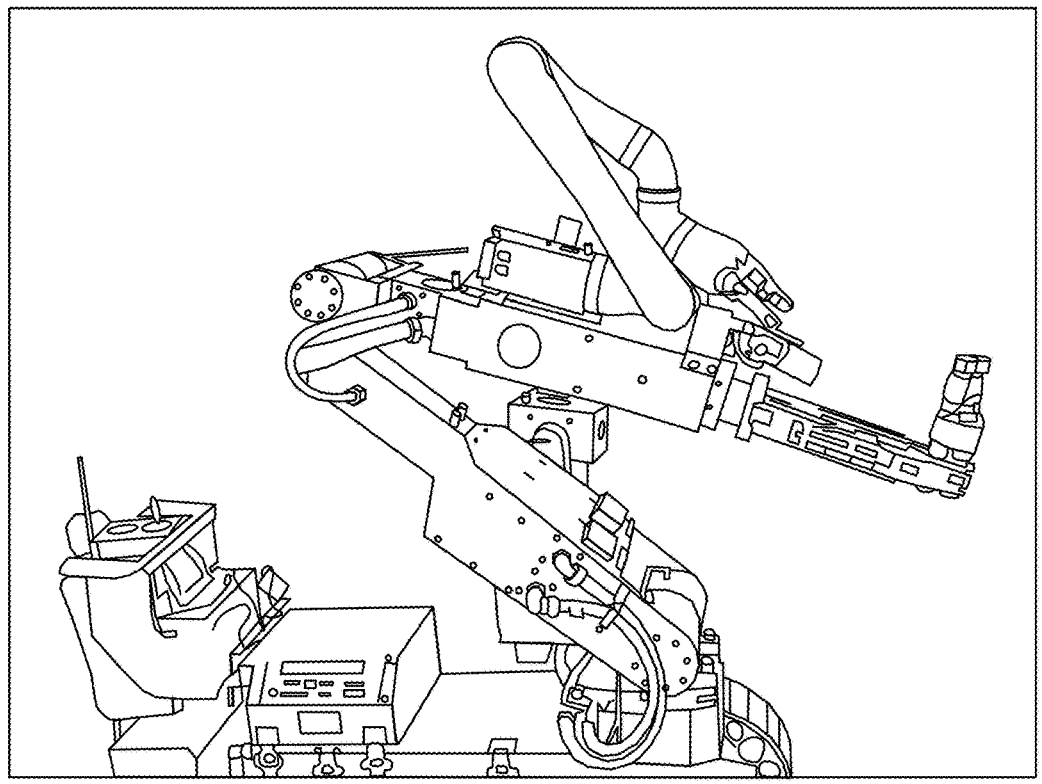
Figure 11H:
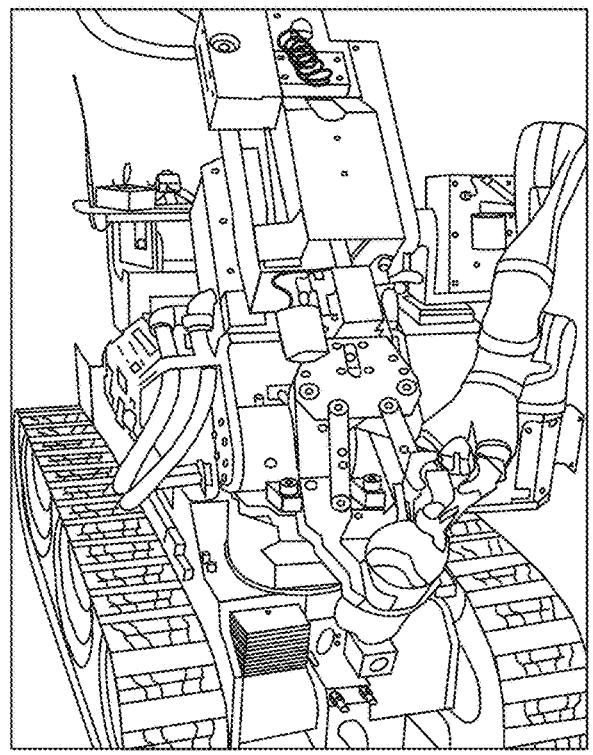
Figure 11I:
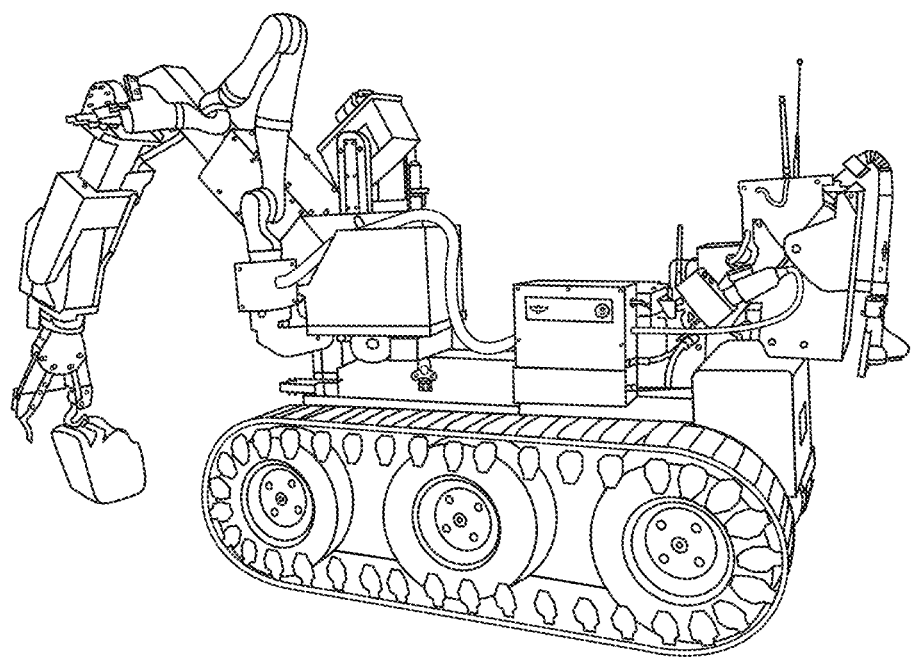
Figure 11J:
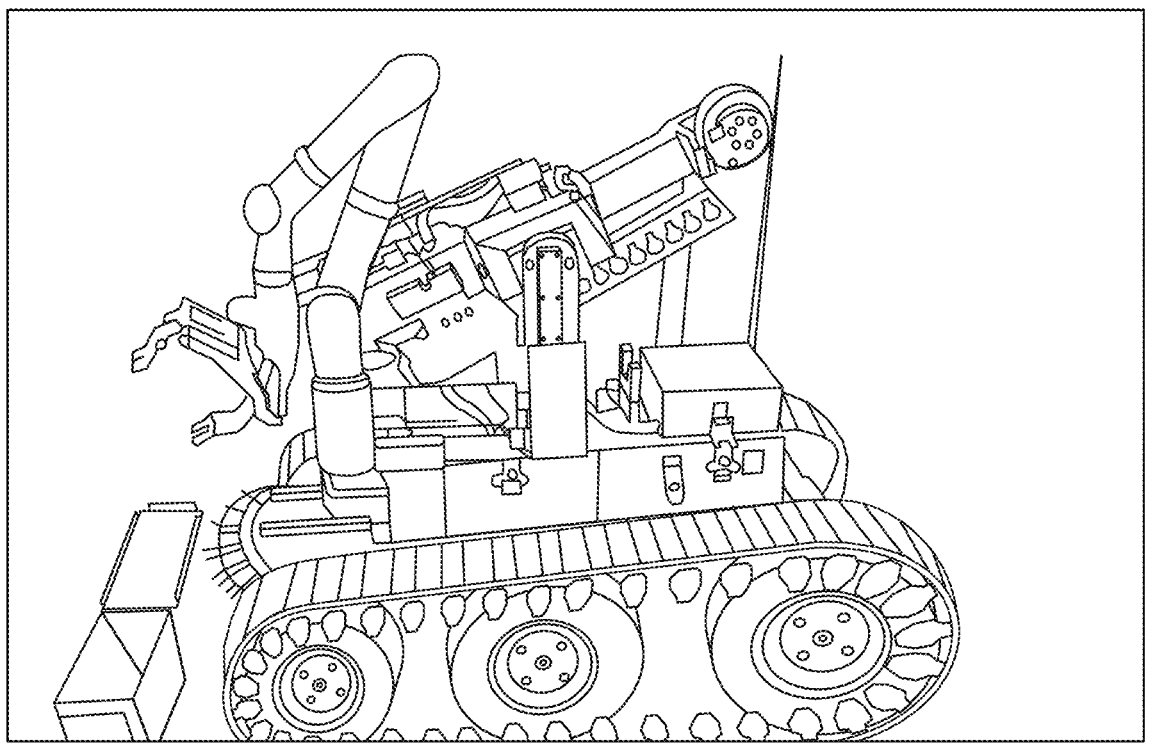

FIGS. 11A, 11B, 11C, 11D, 11E, 11F, 11G, 11H, 11I and 11J are images of example accessory robotic arms integrated on a robotic vehicle and performing fine motor skill tasks all in accordance with some example embodiments. According to some example embodiments, the accessory robotic arm may be used to perform additional fine motor skill tasks besides manipulating dedicated tools. In some example, the accessory robotic arm may enable, selectively lifting an item in a box, unscrewing a bottle cap, pulling a wire on an explosive and opening a vehicle door. The fine motor skills may be performed in difficult to reach places that would otherwise not be visible with an imaging system of the robotic vehicle (FIGS. 11E and 11F). In some example embodiments, the accessory robotic arm may be operated together with the existing robotic arm (a gross motor skill robotic arm) of the robotic vehicle (FIGS. 11G and 11H). The gross motor skill robotic arm may stabilize or hold the explosive device optionally in a desired orientation, while the accessory robotic arm disarms the explosive. In some examples, the gross motor skill arm and the accessory robotic arm are operated consecutively (FIGS. 11I and 11J).

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

In addition, any priority document(s) of this application is/are hereby incorporated herein by reference in its/their entirety.

What is claimed is:

1. A robotic arm comprising:
   an arm including a plurality of degrees of freedom; and
   a gripper including a pair of claws and wherein each claw of the pair includes a first portion of a connector that is connectable to a second portion of the connector integrated on each of a plurality of tools;
   wherein said first portion of said connector includes at least one male connecting part and wherein said second portion of said connector includes a receptacle.

2. The robotic arm according to claim 1, wherein gripping of the tool prevents rotational movement of a handle of the tool with respect to the pair of claws.

3. The robotic arm according to claim 1, wherein the first portion of the connector and the second portion of the connector are electrically connected.

4. The robotic arm according to claim 1, comprising at least one of a camera for imaging a working area of the gripper, a thermal camera for imaging a working area of the gripper, a light emitting diode (LED) for illuminating a working area of the gripper, and a laser pointable in a working area of the gripper.

5. The robotic arm according to claim 1, wherein the gripper is alternately connectable to each of the plurality of tools based on remote controlled movement.

6. The robotic arm according to claim 1, wherein movement of the gripper is controllable based on remote commands received via a wireless communication channel.

7. The robotic arm according to claim 6, comprising at least one sensor, wherein output from the at least one sensor is transmittable via the wireless communication channel.

8. A kit for a robotic arm comprising:
   a cartridge comprising a plurality of bores sized and shaped to receive tools, wherein said cartridge is mountable on a robotic vehicle; and
   a plurality of tools, storable in the bores of the cartridge; wherein each of the plurality of tools includes a second portion of a connector that is mechanically connectable to a counterpart first portion of a connector on a claw of a robotic arm;
   wherein said first portion of said connector includes at least one male connecting part and wherein said second portion of said connector includes a receptacle.

9. The kit according to claim 8, wherein at least one of the plurality of tools includes a handle and wherein the handle is formed with a pair of the second portions of the connector on opposing surfaces.

10. The kit according to claim 8, wherein a said second portion of a said connector is electrically connectable to a counterpart first portion of a said connector on a claw of a robotic arm.

11. The kit according to claim 8, wherein the plurality of tools is selected from a group including, knives, scissors, screw drivers, pliers, picks, and hooks.

12. A robotic vehicle comprising:
   a motor vehicle, said motor vehicle maneurverable based on remote control;
   a first robotic arm mounted on the robotic vehicle, said first robotic arm configured for performing gross motor skill tasks;
   a second robotic arm mounted on the robotic vehicle, said second robotic armconfigured for performing fine motor skill tasks; and
   wherein operation of each of the first robotic arm, the second robotic arm and the motor vehicle is controllable based on remote control commands received via a wireless communication channel;
   wherein said second robotic arm includes a gripper including a pair of claws and wherein each claw of the pair includes a first portion of a connector that is connectable to a second portion of the connector integrated on each of a plurality of tools; and
   wherein said first portion of said connector includes at least one male connecting part and wherein said second portion of said connector includes a receptacle.

13. The robotic vehicle according to claim 12, wherein the second robotic arm comprises:
   an arm including a plurality of degrees of freedom.

14. The robotic vehicle according to claim 12, wherein movement between the first robotic arm and the second robotic arm is coordinatable by a controller.

15. The robotic vehicle according to claim 12 comprising a tool kit, wherein the tool kit comprises:
   a cartridge comprising a plurality of bores sized and shaped for receiving tools, wherein the cartridge is mountable on a robotic vehicle; and
   a plurality of tools storable in the bores of the cartridge; wherein each of the plurality of tools includes a second portion of a connector that is mechanically connectable to a counterpart first portion of a connector on a claw of a robotic arm.

16. The robotic vehicle according to claim 12 comprising at least one sensor, wherein output from the at least one sensor is communicatable to a remote control device via the wireless communication channel.

17. The robotic vehicle according to claim 12, wherein at least one of:
   said gross motor skills include stabilizing and holding an explosive device; and
   said fine motor skills include disarming the explosive device.

18. The robotic vehicle according to claim 17, wherein said gross motor skills include holding the explosive device in a desired orientation.

19. The robotic vehicle according to claim 12, wherein said first robotic arm and said second robotic arm are operatable consecutively.

20. The robotic vehicle according to claim 12, wherein said first robotic arm and said second robotic arm are operatable simultaneously.

\* \* \* \* \*